US008139169B2

(12) United States Patent
Ogino

(10) Patent No.: US 8,139,169 B2
(45) Date of Patent: Mar. 20, 2012

(54) LIQUID CRYSTAL TV SET AND LIQUID CRYSTAL DISPLAY UNIT

(75) Inventor: Yoshihiro Ogino, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 1290 days.

(21) Appl. No.: 11/784,669

(22) Filed: Apr. 9, 2007

(65) Prior Publication Data

US 2007/0242170 A1 Oct. 18, 2007

(30) Foreign Application Priority Data

Apr. 12, 2006 (JP) ................................ 2006-110108

(51) Int. Cl.
*H04N 3/14* (2006.01)
*H04N 5/63* (2006.01)
*G09G 3/36* (2006.01)
*G09G 5/00* (2006.01)
*G06F 3/038* (2006.01)

(52) U.S. Cl. ............ 348/790; 348/730; 345/87; 345/89; 345/92; 345/98; 345/100; 345/204; 345/212; 345/214

(58) Field of Classification Search ........................ None
See application file for complete search history.

(56) References Cited

U.S. PATENT DOCUMENTS 6,219,016 B1 * 4/2001 Lee ................................ 345/87
2004/0017112 A1 1/2004 Kim et al.
2005/0127983 A1 6/2005 Takagi et al.

FOREIGN PATENT DOCUMENTS

JP 02-273720 11/1990
JP 2000-105566 4/2000
JP 2001-249320 9/2001
JP 2003-122311 4/2003
JP 2005-331927 12/2005

OTHER PUBLICATIONS

The extended European search report, pursuant to Rule 44a EPC dated Jul. 25, 2007, searched on Jun. 29, 2007.
Advanced Silicon SA: 'ASTLC5301A' Internet Article—Data Sheet, May 6, 2003, XP002439907.
Anonymous: 'Plasma TV Service Manual' Internet Article, Oct. 24, 2003, XP002439954.
Anonymous: 'Schematics and PWB's' Philips EM2E Service Manual, Mar. 12, 2006, XP002439908.
Texas Instruments: 'LTPS-LCD bias power supply, triple charge pump' Internet Article—TPS65110, TPS65111, 2003, XP002439909.
Japanese Notice of the reason for refusal, dated Apr. 2, 2008.

* cited by examiner

*Primary Examiner* — Jefferey Harold
*Assistant Examiner* — Sean Haiem
(74) *Attorney, Agent, or Firm* — Yokoi & Co., U.S.A., Inc.; Toshiyuki Yokoi

(57) ABSTRACT

Disclosed are a liquid crystal display unit and a liquid crystal TV set, each of which has a sequence circuit 13 that includes first, second, and third voltage output units. The sequence circuit 13, upon the turning-on of the power to the liquid crystal display unit 11, supplies the first, second, and third output voltages to a liquid crystal display panel 11*c* in this order and stops supply of the third, second, and first output voltages in this order upon the turning-off of the power to the liquid crystal display unit 11. Consequently, the display screen is prevented from the noise that is otherwise generated on the screen.

3 Claims, 4 Drawing Sheets

LIQUID CRYSTAL TV SET AND LIQUID CRYSTAL DISPLAY UNIT

CROSS-REFERENCE TO RELATED APPLICATION

The present application is related to the Japanese Patent Application No. 2006-110108, filed Apr. 12, 2006, the entire disclosure of which is expressly incorporated by reference herein.

BACKGROUND OF THE INVENTION

1. Field of the Invention

The present invention relates to a liquid crystal display unit including a sequence circuit that is supplied plural supply voltages and supplies plural supply voltages to a liquid crystal display panel in a predetermined sequence, and a liquid crystal TV set that includes the sequence circuit.

2. Description of the Related Art

In each of liquid crystal display units and liquid crystal TV sets, plural types of voltages are supplied to its liquid crystal display panel through a predetermined cable. The liquid crystal display panel makes normal operations with those types of voltages supplied in a predetermined sequence. Consequently, supply and stop of the supply of those plurality types of voltages are made in a predetermined order and the order must be observed.

FIG. 3 shows a circuit diagram of such a sequence circuit employed for a conventional liquid crystal display unit and a conventional liquid crystal TV set respectively. The sequence circuit generates plural types of voltages from plural types of voltages supplied from a power supply circuit and supplies and stops the supply of those voltages to a liquid crystal display panel of the liquid crystal display unit in a predetermined sequence. In the circuit diagram, units and parts unnecessary for sequence controlling are omitted.

At first, a description will be made for the operation of the sequence circuit when the power to the liquid crystal display unit is turned on. In FIG. 3, upon the turning-on of the power to the liquid crystal display unit and the beginning of voltage supply from the power supply circuit, a high level P-ON-H signal and a high level P-25V-ON signal are inputted to the sequence circuit at a predetermined timing respectively. Consequently, the transistors Q507 and Q511 are turned on and an operation sequence is started by the sequence circuit.

The sequence circuit, when inputting 3.3V, outputs the 3.3V as is to the liquid crystal display panel (sequence 1). Then, −8V is applied to the emitter of the transistor Q513 in the sequence circuit. Thus a potential difference is generated in the base-emitter line of the transistor Q513, thereby the transistor Q513 is self-biased and turned on (sequence 2). Consequently, −8V is supplied to the resistor R517 through the emitter-collector line of the transistor Q513 and −6V is supplied to the liquid crystal display panel through the resistor R517.

And −8V is also supplied to the base of the transistor Q509 through the resistor R517, the Zener diode D519, and the resistor R518. At this time, 40V supplied from the power supply circuit is applied to the emitter of the transistor Q509. Here, the collector terminal of the transistor Q507 is connected to the other terminal of the R511 connected to the base of the transistor Q509 in parallel to the resistor R518. And the emitter of the transistor Q507 is grounded and the transistor Q507 is turned on with a P-ON-H signal inputted to its base. The P-ON-H signal is a control signal that enters the high level (predetermined voltage) when the power to the liquid crystal display unit is turned on and enters the low level (0V) when the power is turned off.

Thus the transistor Q509 is turned on (sequence 3) and a voltage is supplied to the bases of the transistors Q505 and Q505' from the 40V line through the resistor R508. At this time, the Zener breakdown occurs in the Zener diode D503, thereby the voltage supplied to the bases of the transistors R505 and R505' is lowered to a predetermined voltage.

Then, the transistor Q505 is turned on (sequence 4) and the transistor Q505' is turned on (sequence 5). Thus the voltages supplied from the 13V and 21 V lines are output through the resistors R509 and R534 to the liquid crystal display panel as 10.8V.

On the other hand, 40V is applied to the emitter of the transistor R502 through the resistor R552 and the base of the Q502 is grounded through the Q511, thereby the transistor R502 is turned on. Then, 40V is applied to the base of the transistor Q501 through the resistor 552, the emitter-collector line of the transistor Q502, and the resistor R505, thereby the transistor Q501 is turned on (sequence 6). Consequently, 25V is output to the liquid crystal display panel through the emitter-collector line of the transistor Q501.

Next, a description will be made for the operation of the sequence circuit upon the turning-off of the liquid crystal display unit with reference to FIG. 3. Upon the turning-off of the power to the liquid crystal display unit, the voltage supply to the liquid crystal display panel is stopped in the following sequence shown in FIG. 3.

Upon the turning-off of the liquid crystal display unit, the P-25V-ON signal applied to the base of the transistor Q511 enters the low level (0V) and the transistor Q511 is turned off. Consequently, the transistor Q502 is turned off, then the transistor Q501 is turned off (sequence 11). As a result, the 25V supply to the liquid crystal display panel is stopped.

After that, the P-ON-H signal applied to the base of the transistor Q507 enters the low level (0V) and the transistor Q507 is turned off. However, because a current keeps flowing through the resistor Q518, a potential difference is generated between the base and the emitter of the Q509, so that the Q509 is not turned off. Consequently, 10.8V is kept output to the liquid crystal display panel.

After that, upon the stop of the voltage supply including 3.3V from the power supply circuit, the transistor Q510 is turned off, then the transistor Q513 is turned off (sequence 13). At the same time, the 40V supply is also stopped while a voltage is kept applied to the R518 until the remaining 40V charge is discharged completely. Thus the transistor Q509 is not turned off immediately at this time. After the discharging is completed, the transistor Q509 is turned off, then the transistors Q505 and Q505' are turned off (sequence 12), thereby the 10.8V supply to the liquid crystal display panel is stopped.

Japanese Unexamined Patent Application Publication (JP-A) No. 331927/2005 discloses a display unit power-down short-circuit, in which if the main supply voltage is lowered under a predetermined level, the short-circuit control terminal is connected to a display power line through a diode, thereby the short-circuit is turned on and the display voltage is discharged to the ground.

JP-A-122311/2003 discloses a discharging unit of a picture display panel, in which a voltage dropping means makes trailing of a potential of a common electrode delay than trailing of a potential of a gate voltage.

In the conventional sequence circuit described above, the transistor Q509 is not turned off while the transistor Q507 is turned off in a sequence for stopping the voltage supply. Furthermore, although the voltage supply must be stopped in the order of 11, 12, and 13, the power supply is stopped in the order of 11, 13, and 12. This causes a voltage to be kept applied to the resistor R518 until the sequence 13 is ended and the transistor Q509 keeps outputting a voltage, thereby generating white-line-like noise on the screen. JP-A-331927/2005 and JP-A-122311/2003 are not related to supply of voltages from plural power supplies in a predetermined sequence.

BRIEF SUMMARY OF THE INVENTION

Under such circumstances, it is an object of the present invention to provide a liquid crystal display unit and a liquid crystal TV set that can prevent noise that might otherwise be generated on the screen of the liquid crystal display panel with use of a sequence circuit provided to discharge a specific voltage completely at the time of AC power off.

The present invention discloses a liquid crystal display unit for inputting a supply voltage from a power supply circuit and displaying a picture on a liquid crystal display panel according to an inputted picture signal; comprising: the display unit includes a sequence circuit that generates various levels of voltages using various levels voltages output from the power supply circuit and supplies the generated voltages to the liquid crystal display panel in a predetermined sequence; the sequence circuit includes: a first voltage output part outputting a first output voltage using inputted a first input voltage and; a second voltage output part outputting a second output voltage using inputted a second input voltage; and a third voltage output part outputting a third output voltage using inputted a third input voltage; if the liquid crystal display unit is turned-on, the first output voltage is supplied to the liquid crystal display firstly, the second output voltage is supplied to the liquid crystal display secondly, and the third output voltage is supplied to the liquid crystal display thirdly, and if the liquid crystal display unit is turned-off, the third output voltage is stopped firstly, the second output voltage is stopped secondly, and the first output voltage is stopped thirdly.

The first, second, and third input voltages can be lower than the first, second, and third output voltages and each input voltage can be a combination of plural voltages selected freely from among plural output voltages output from the above power supply circuit. The above predetermined sequences can be determined freely. Particularly in the preferred embodiment of the present invention, the sequence for supplying a power to the liquid crystal display panel is inverted from the sequence for stopping the voltages supplied to the liquid crystal display panel. Consequently, when plural types of voltages are required to drive the above liquid crystal display panel and the sequence for inputting the plurality of voltages and the sequence for stopping the supply of the voltages are predetermined, voltages can be supplied to the liquid crystal display panel and the voltage supply can be stopped in the same sequences as those described above.

This is why the present invention can provide a liquid crystal display unit and a liquid crystal TV set that are capable of supplying voltages and stopping the voltage supply in the same sequences as those for inputting the plurality types of voltages for driving the liquid crystal display panel and for stopping the voltage supply. Consequently, a specific voltage can be discharged completely at the time of AC off, thereby the noise that is otherwise generated on the screen of the liquid crystal display panel can be prevented.

An optional aspect of the present invention, the second voltage output unit described above is composed of plural switching transistors connected to each another in multiple steps. And a Zener diode is connected to the base of any or a combination of those switching transistors in the forward direction in which a current flows upon the turning-on of the transistor.

Because plural switching transistors are combined in multiple steps such way, it is easy to set a desired output voltage and control the voltage output timing. In a sequence for stopping voltage supply, a Zener diode is connected to the base of any or a combination of the plurality of switching transistors to control so that the switching transistor turning-off time is shorten and each switching transistor is turned off at a desired time regardless of the voltage applied to the base-emitter line of the transistor.

Another aspect of the present invention provides a liquid crystal display unit wherein: the second input voltage inputted to the emitter of the PNP type switching transistor is discharged through a self-biased resistor after the stop of its input and a time required until the NPN type switching transistor is turned off is longer than an interval of the sequence; and a timing at which the PNP type switching transistor is turned off by the Zener diode is adjusted in the sequence.

One aspect of the present invention provides A liquid crystal TV set, comprising: a tuner that receives a TV broadcast and extracts a TV broadcasting signal from the TV broadcast, and that output the TV broadcasting signal; a picture processor for displaying a picture on a liquid crystal display panel according to the TV broadcasting signal output from the tuner; a voice processor for outputting a voice from a speaker according to the TV broadcasting signal output from the tuner; a power supply circuit for supplying various types of supply voltages; a microcomputer for controlling an operation of the TV set; the TV set includes a sequence circuit for generating various types of voltages on the basis of various types of voltages output from the power supply circuit and supplying the generated voltages to the liquid crystal display panel in a predetermined sequence; the sequence circuit includes: a first output line for inputting a first input voltage and outputting the first input voltage to the liquid crystal display panel as a first output voltage; a first NPN type transistor having a base grounded through a capacitor and connected through a first resistor to a collector of the first transistor that inputs a second input voltage, the first transistor outputting a second output voltage to the liquid crystal display panel; an epitaxial planar NPN type second transistor having a grounded emitter, and turned on with inputting a first power-on-signal to a base of the second transistor and turned off with stopping input of the first power-on-signal to the base of the second transistor from the microcomputer, respectively; a first Zener diode having an anode connected to the emitter of the first transistor through a second resistor and a cathode connected to the collector of the second transistor through a third resistor; a PNP type third transistor having a base connected to the cathode of the Zener diode, and an emitter connected to the base of the third transistor through a fourth resistor and supplied a third input voltage; an NPN type fourth transistor having a base connected to the collector of the third transistor through a fifth resistor, an emitter grounded through a sixth resistor, and a collector being supplied a fourth input voltage through a seventh resistor; an NPN type fifth transistor having a base connected to the collector of the third transistor through the fifth resistor, an emitter grounded through the sixth resistor, a collector being supplied the fourth input voltage through the seventh resistor, and the fourth and fifth transistor outputting a third output voltage to the liquid crystal display panel; a second Zener diode having a cathode connected to the bases of the fourth and fifth transistors respectively and a grounded anode; an epitaxial planar NPN type sixth transistor having a grounded emitter and turned on with inputting a second power on signal to the base of the sixth epitaxial planar NPN type transistor and turned off with stopping the second power on signal to the base of the sixth epitaxial planar NPN type transistor from the microcomputer, respectively; a PNP type seventh transistor having a base connected to the collector of the sixth transistor and an emitter connected to the base of a seventh transistor through a eighth resistor and supplied the third input voltage; an NPN type eighth transistor having a collector connected to the emitter of the seventh transistor through a ninth resistor, a base connected to the collector of the seventh transistor through a tenth resistor, an emitter grounded through a eleventh resistor, the eighth transistor outputting a fourth output voltage to the liquid crystal display panel; and a third Zener diode having a cathode connected to the base of the eighth transistor and a grounded anode, the sequence circuit, when inputting the first, the second, the third and the fourth input voltages after the TV set is powered and the first power-on-signal is inputted, outputs the first output voltage as is at first; the second input voltage is applied to the collector of the first transistor, which is then self-biased and turned on to output the second output voltage; the second transistor is turned on with the first power-on-signal inputted to the base of the second transistor, thereby the third transistor is turned on, then the third, fourth, and fifth transistors are turned on and voltages supplied from the fourth input voltage line are lowered through the seventh resistor to be output as the third output voltage; finally, upon the turning-on of the sixth transistor with the second power-on-signal inputted later than the first power-on-signal, the seventh transistor is self-biased and turned on with the third input voltage applied to the emitter of the seventh transistor, so that the eighth transistor is turned on to output the fourth output voltage, thereby voltages are supplied to the liquid crystal TV set in the order corresponding to the first output voltage, the second output voltage, the third output voltage and the fourth output voltage; upon the turning-off of the power to the liquid crystal TV set, the first power-on-signal is stopped and the inputs of the first, the second, the third and the fourth input voltages to the sequence circuit are stopped; in the sequence circuit, the second-power-on signal inputted to the base of the sixth transistor is stopped, thereby the sixth transistor is turned off, then the seventh and eighth transistors are turned off to stop supply of the fourth output voltage to the liquid crystal display panel; the first power-on-signal is stopped and the second transistor is turned off, discharging of the remaining charge of the third input voltage inputted to the third transistor begins through the first Zener diode, and upon the lowering of the third input voltage to the break voltage of the first Zener diode, the first Zener diode stops breakdown and the third transistor is turned off to stop outputting the third output voltage; and finally, the first input voltage supply is stopped, thereby the first transistor is turned off and the second output voltage is stopped, thereby supply of voltages to the liquid crystal TV set are stopped in the order corresponding to the fourth output voltage, the third output voltage, the first output voltage and the second output voltage.

Upon the turning-on of the liquid crystal TV set, the 3.3V is supplied as is to the liquid crystal display unit first through the 3.3V line. Then, the first transistor is turned on to supply–6V to the liquid crystal display panel. After that, upon the input of a high level P-25V-ON signal from the microcomputer, the second transistor is turned on and the third, fourth, and fifth transistors are turned on sequentially in this order to supply 10.8V to the liquid crystal display panel. Then, a high level P-25V-ON signal is inputted to the base of the sixth transistor later than the above P-ON-H signal, thereby the sixth transistor is turned on. As a result, the seventh and eighth transistors are turned on to supply 25V to the liquid crystal display panel.

Upon turning-off of the liquid crystal display unit, at first the P-25V-ON signal enters the low level and the sixth transistor is turned off. Thus the seventh and eighth transistors are also turned off. Then, because the P-ON-H signal also enters the low level after the P-25V-ON signal enters the low level, the second transistor is turned off. At this time, the voltage applied to the base of the third transistor falls to the Zener voltage determined by the first Zener diode. Then, no current flows to the collector of the first transistor from the third transistor base, thereby the third transistor is turned off. And upon the stop of the supply voltage from the power supply circuit, the 3.3V supply to the liquid crystal display panel is stopped and the first transistor is turned off.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character(s) present corresponding parts throughout.

DETAILED DESCRIPTION OF THE INVENTION

Hereunder, a preferred embodiment of the present invention will be described in the following order.

Figure 1:
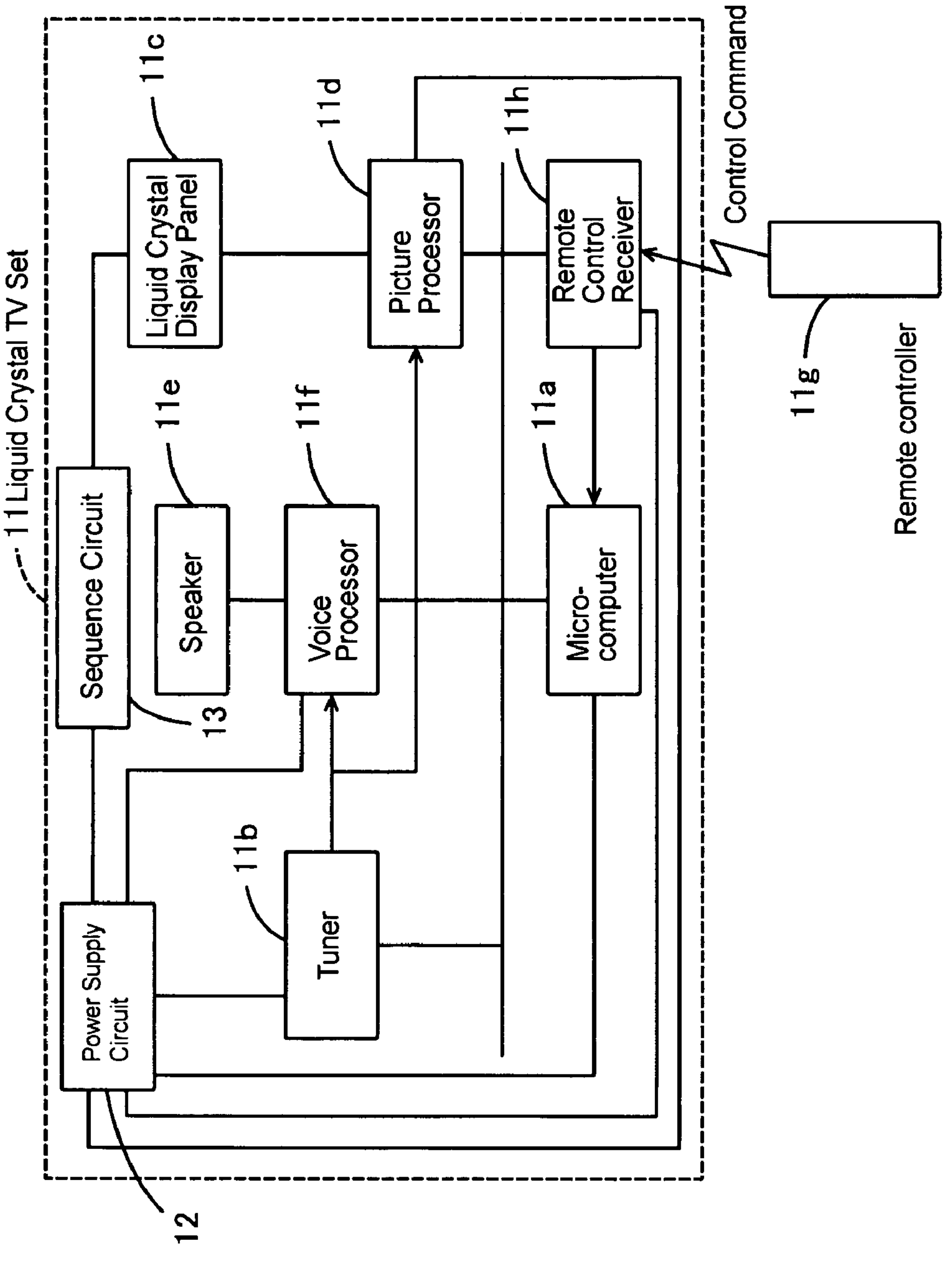
FIG. 1 is a schematic block diagram of a configuration of a liquid crystal TV set in a first embodiment of the present invention.

(1) Configuration of liquid crystal TV set
(2) Sequence circuit
(3) Conclusion (1) Configuration of Liquid Crystal TV Set Hereunder, an embodiment of the present invention will be described in detail with reference to the accompanying drawings. FIG. 1 shows a schematic block diagram of a configuration of a liquid crystal TV set of the present invention.

In FIG. 1, the liquid crystal TV set 11 includes a microcomputer 11*a* for controlling the operation of the whole body; a tuner 11*b* for extracting TV broadcasting signals of a selected channel from TV broadcasting signals received through an antenna and outputting the extracted signals; a picture processor 11*d* for displaying pictures on a liquid crystal display panel 11*c* according to the TV broadcasting signals output from the tuner 11*b*; a voice processor 11*f* for outputting voices from a speaker 11*e* according to the TV broadcasting signals output from the tuner 11*b*; a remote control receiver 11*h* for receiving operation commands sent from a remote controller 11g; and a power supply circuit 12 for supplying a supply voltage to each unit of the liquid crystal TV set 11.

The micro computer 11a controls each unit of the liquid crystal TV set by outputting such control signals as P-ON-H (a first power-on-signal) and P-25V-ON (a second power-on-signal) according to control commands received by the remote control receiver 11h.

The power supply circuit 12 is supplied an external commercial power (e.g. AC100V) and converts the supplied voltage to various types of voltages to be supplied to each unit of the liquid crystal TV set 11 as operation powers. Particularly, the liquid crystal display panel 11c is supplied a supply voltage from the power supply circuit 12 through the sequence circuit 13. The sequence circuit 13 generates plural types of voltages on the basis of the plurality types of voltages supplied from the power supply circuit 12 upon the turning-on of the liquid crystal TV set and supplies those voltages to the liquid crystal display panel 11c in a predetermined sequence. Upon the turning-off of the liquid crystal TV set, the sequence circuit stops the voltage supply to the liquid crystal display panel in a predetermined sequence. The power supply circuit 12 is supplied an external power (e.g., AC100V).

(2) Sequence Circuit

Figure 2:
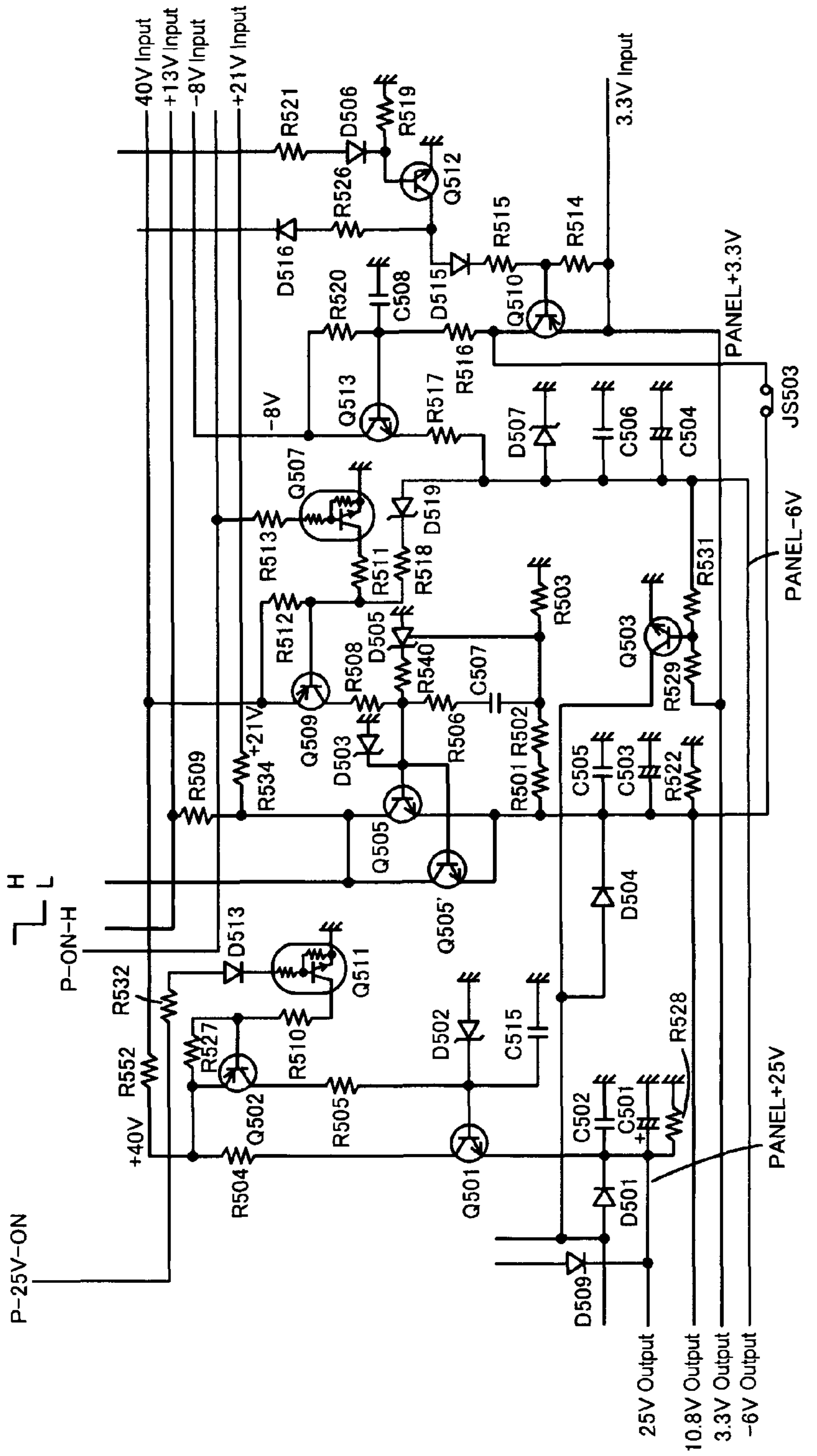
FIG. 2 is a diagram of a sequence circuit in the first embodiment of the present invention.

FIG. 2 shows a sequence circuit 13 for supplying plural types of voltages to the liquid crystal display panel 11c in this embodiment in a predetermined sequence and stops the voltage supply. The sequence circuit 13 generates plural types of voltages from plural types of voltages supplied from the power supply circuit 12 and supplies the generated voltages to the liquid crystal display panel 11c and stops the voltage supply in a predetermined sequence respectively. In FIG. 2, units and parts unnecessary for sequence controlling are omitted.

In FIG. 2, the sequence circuit 13 includes transistors Q513, Q517, Q509, Q505, Q505', Q511, Q502, and Q501, resistors R520, R516, R517, R518, R513, R511, R512, R508, R534, R509, R522, R552, R532, R527, R510, R505, R504, and R528, and Zener diodes D507, D519, D503, and D502. The sequence circuit 13 is supplied 3.3V, 21V, −8V, 13V, and 40V through 3.3V, 21V, −8V, 13V, and 40V lines respectively.

The 3.3V line inputs 3.3V and outputs the 3.3V as is to the liquid crystal display panel 11c.

The transistor Q513 is an NPN type one and its base is grounded through a capacitor C508 and its base is connected to its collector through the resistor R520. The transistor Q513 is self-biased and turned on with −8V inputted to its collector through the −8V line. The transistor Q513 functions as the first transistor and outputs −6V to the liquid crystal display panel as the second voltage output part. The 3.3V is equivalent to the first input voltage and the 3.3V line functions as the first voltage output part.

The transistor Q507 (model No.: KRC103M) is an epitaxial planar NPN type transistor. Its emitter is grounded. The Q507 is turned on with a high level P-ON-H signal inputted to its base through the resistor R513. The transistor Q507 functions as the second transistor. The P-ON-H signal is a control signal that enters the high level (predetermined voltage) upon the turning-on of the liquid crystal TV set and enters the low level (0V) upon the turning-off of the liquid crystal TV set. The signal is output from the microcomputer 11a.

The Zener diode D519 (model No.: MTZJ-36B) has an anode connected to the collector of the transistor Q513 through the resistor R517 and a cathode connected to the collector of the transistor Q507 through the resistors R518 and R511. This Zener diode D519 is broken down, for example, at 36V. While this sequence circuit is active, about 48V is applied to the resistors R512 and R518, the Zener diode D519, the resistor R517, and the emitter-collector line of the transistor Q513 respectively, so that about 40V is applied to the Zener diode D519. Upon the stop of the supply of about 40V, the Zener diode D519 begins discharging in the inverted direction (e.g., through the Zener diode D507). At this time, however, the breakdown stops at 36V, so that the base of the transistor Q509 comes to be disconnected from the ground electrically at the time of discharging equivalent to a voltage drop of a little under 4V. In other words, after the supply voltage from the 40V line to the transistor Q509 is stopped, the transistor Q509 can be turned off quickly. This “quickly” means that the time is shorter than a time required to lower the 40V to a voltage for turning off the transistor Q509. The Zener diode D519 functions as the first Zener diode.

The transistor Q509 is a PNP type transistor and its base is connected to the cathode of the Zener diode D519 and its emitter is connected to its base through the resistor R512. The emitter is supplied 40V through the 40V line. The transistor Q509 functions as the third transistor.

The transistor Q505 is an NPN type transistor and its base is connected to the collector of the transistor Q509 through the resistor R508 and its emitter is grounded through the resistor R522, and its collector is supplied 13V and 21 V in parallel through the resistors R509 and R534 respectively. The transistor Q505 functions as the fourth transistor and the 13V and 21V supplied in parallel are converted to the second input voltage.

The transistor Q505' is an NPN type transistor and its base is connected to the collector of the transistor Q509 through the resistor R508, its emitter is grounded through the resistor R522, and its collector is supplied 13V and 21V in parallel through the resistors R509 and R534 respectively The transistor Q505 functions as the fifth transistor. The collectors of the transistors Q505 and Q505' are connected to each other to output 10.8V to the liquid crystal display panel in parallel to the resistor R522. Consequently, the 10.8V becomes equivalent to the second output voltage and the transistors Q513, Q507, Q509, Q505, and Q505', the resistors R516, R520, R517, R518, R511, R513, R512, R518, R509, R534, and R522, the Zener diodes D519, D503, and D507 are combined to form the second voltage output unit.

The Zener diode D503 has a cathode connected to the bases of the transistors Q505 and Q505' and a grounded anode. The Zener diode D503 has a Zener voltage for controlling so that the voltage applied to the bases of the transistors Q505 and Q505' do not exceed a predetermined value.

The transistor Q511 is an epitaxial planar NPN type transistor and its emitter is grounded. The Q511 is turned on with a high level P-25V-ON signal inputted to its base. The P-25V-ON signal is a control signal that enters the high level (predetermined voltage) upon the turning-on of the power to the liquid crystal TV set 11 and enters the low level (0V) upon the turning-off of the power. The control signal is output from the microcomputer 11a later than the P-ON-H signal. The transistor Q511 functions as the sixth transistor.

The transistor Q502 is a PNP type transistor and its base is connected to the collector of the transistor Q511 and its emitter is connected to its base through the resistor R527. The emitter is supplied 40V from the 40V line through the resistor R552. The transistor Q502 functions as the seventh transistor.

The transistor Q501 is an NPN type transistor and its collector is connected to the emitter of the transistor Q502 through the resistor R505 and its base is connected to the collector of the transistor Q501 through the resistor R504, and its emitter is grounded through the resistor R528 and outputs 25V to the liquid crystal display panel 11c in parallel to the resistor R528. The transistor Q501 functions as the eighth transistor.

The Zener diode D502 has a cathode connected to the base of the transistor Q501 and a grounded anode. The Zener diode D502 has a Zener voltage for controlling so as to fix the voltage applied to the base of the transistor Q501. The Zener diode D502 functions as the third Zener diode. Consequently, the 40V is equivalent to the third input voltage and the 25V is equivalent to the third output voltage. The transistors Q511, Q502, and Q501, the resistors R552, R527, R510, R505, R504, and R528, the Zener diodes D502 are combined to form the third voltage output unit.

Next, a description will be made for the operation of the sequence circuit upon the turning-on of the liquid crystal TV set 11 and the beginning of the voltage supply from the power supply circuit 12. In FIG. 2, upon the turning-on of the liquid crystal TV set 11 and the beginning of the voltage supply from the power supply circuit 12, the voltages 3.3V, 21V, −8V, 13V, and 40V are supplied to the sequence circuit 13.

The inputted 3.3V is output to the liquid crystal display panel 11c as is (sequence 101). Then, the −8V is applied to the emitter of the transistor Q513 and the transistor Q513 is self-biased and turned on (sequence 102). Consequently, −8V is supplied to the resistor through the emitter-collector line of the Q513 and −6V is supplied to the liquid crystal display panel 11c through the resistor R517.

The −8V is also supplied to the base of the transistor Q509 through the resistor R517, the Zener diode D519, and the resistor R518. At that time, the emitter of the transistor Q509 is also supplied 40V from the power supply circuit 12.

Here, the collector of the transistor Q507 is connected to the other terminal of the R511 connected to the base of the transistor Q509 in parallel to the resistor R518 and the emitter of the transistor Q507 is grounded. And the base of the transistor Q507 inputs the P-ON-H signal.

Then, the transistor Q509 is turned on (sequence 103) and a voltage is supplied to the bases of the transistors Q505 and Q505' through the resistor R508 from the 40V line respectively. At this time, the Zener diode D503 breaks down, thereby the voltage applied to the bases of the transistors Q505 and Q505' is lowered to a predetermined voltage. In other words, this Zener diode D503 controls so that the base voltages of both the transistors Q505 and Q505' do not exceed a voltage over the transistor resistance, thereby transistor choices are increased and the cost is reduced.

Upon applying a voltage to the transistors Q505 and Q505', the transistor Q505 is turned on (sequence 104), then the transistor Q505' is also turned on (sequence 105). Then, the voltages supplied through the 13V and 21V lines are lowered to 10.8V through the resistors R509 and R534 respectively and the 10.8V is output to the liquid crystal display panel 11c.

On the other hand, the transistor Q502 of which emitter is applied 40V through the resistor R552 is self-biased through the resistor R527, thereby it is turned on (sequence 106). Then, 40V is supplied to the resistor R505 through the emitter-collector line of the transistor Q502 and a voltage is applied to the base of the transistor Q501, thereby the transistor Q501 is turned on. Then, the 25V is output to the liquid crystal display panel 11c through the emitter-collector line of the transistor Q501. At this time, a voltage matching with the transistor resistance is applied to the base of the transistor Q501 through the Zener diode D502 just like the transistors Q505 and Q505'.

Figure 3:
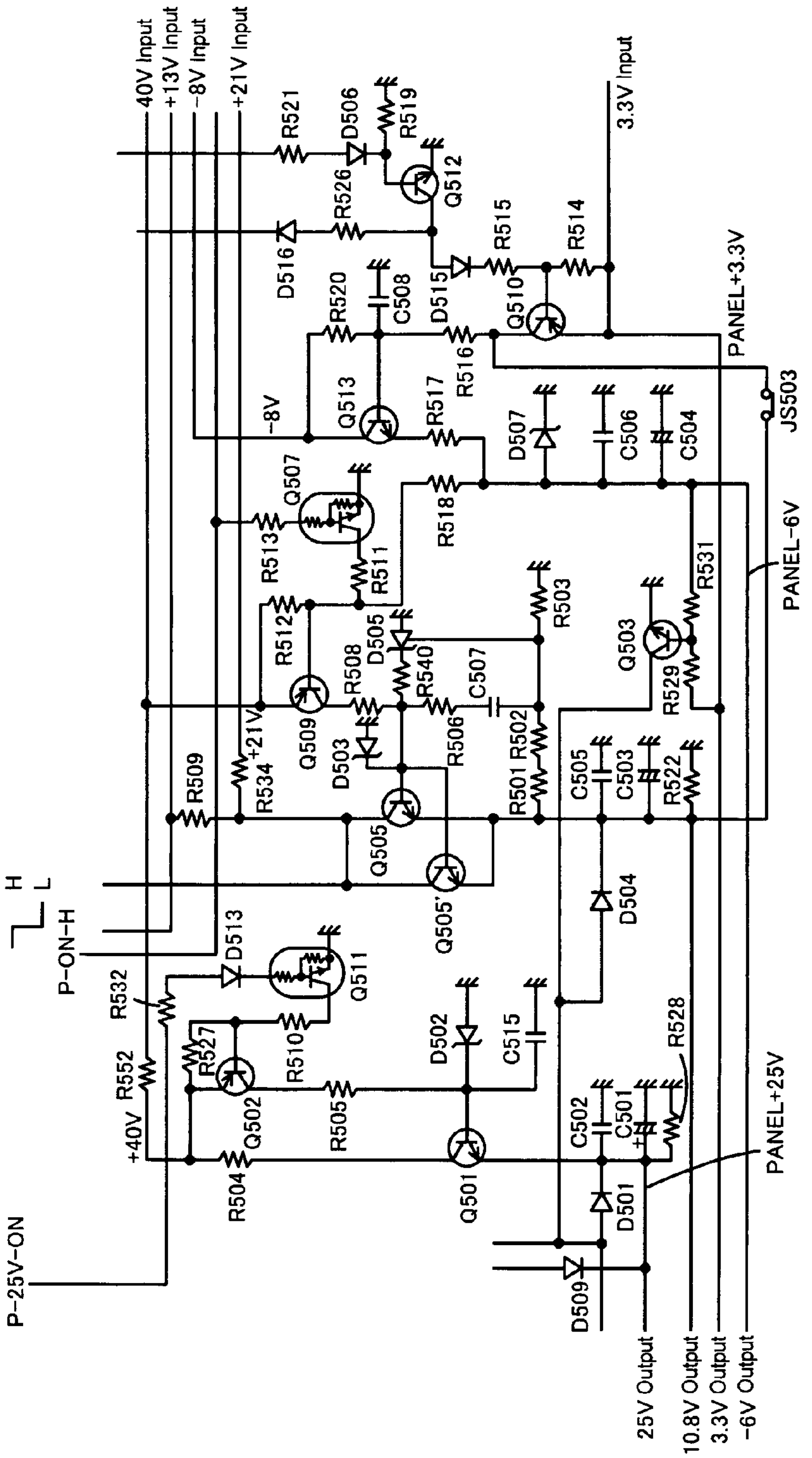
FIG. 3 Prior Art
FIG. 3 is a diagram of a conventional sequence circuit.
Figure 4:
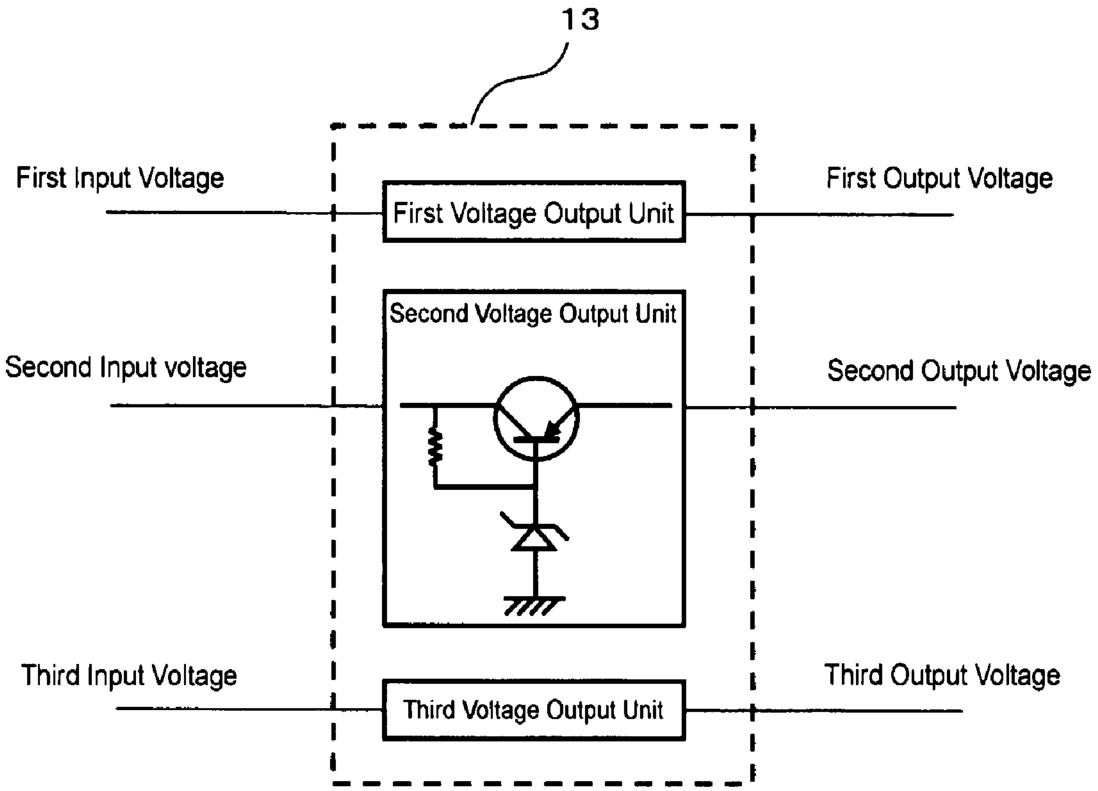
FIG. 4 is a block diagram of a configuration of the sequence circuit in the first embodiment of the present invention.

Next, a description will be made for the operation of the sequence circuit upon the turning-off of the liquid crystal display unit. In FIG. 3, upon the turning-off of the liquid crystal display unit and the stop of the voltage supply from the power supply, the voltage supply to the liquid crystal display panel is stopped in the following sequence.

Upon the stop of the voltage supply, at first the base of the transistor Q511 enters the low level (0V) with the P-25V-ON signal, so that the transistor Q511 is turned off. Consequently, the transistors Q502 and Q501 are turned off (sequence 111). Thus the supply of 25V to the liquid crystal display panel is stopped.

Then, the P-ON-H signal applied to the base of the transistor Q507 enters the low level (0V) and the transistor Q507 is turned off. After that, a current is kept flowing to the ground through the resistor R518 and the Zener diode D519. While the current flows, the transistor Q509 is kept on, thereby the transistors Q505 and Q505' are also kept on and 10.8V is kept output.

At this time, upon the stop of the voltage supply from the power supply circuit, discharging of the 40V that has been applied begins. Then, the 40V is lowered to 36V, so that the Zener diode D519 is not broken down any more and no potential difference is generated in the resistor R512 through which the transistor Q519 is self-biased. Thus the transistor Q519 is turned off. Then, the transistors Q505 and Q505' are also turned off to stop the 10.8V output (sequence 112). The time until the 10.8V output is stopped is short as described above and the time can be adjusted so as to stop the 10.8V output later than the 25V stop and earlier than the −6V stop by selecting the breakdown voltage of the Zener diode D519 properly.

The timing for generating this sequence 112 can be changed as needed by adjusting the breakdown voltage of the Zener diode D519. To set this sequence 112 earlier than the sequence 113 to be described later, it is just needed to change the breakdown voltage from 36V to a value closer to 40V. Such way, it is possible to connect the cathode of the Zener diode having a grounded anode to the base of a transistor to be turned off later than a desired timing.

Then, upon the stop of the voltage supply including 3.3V from the power supply circuit, the transistor Q510 is turned off, then the transistor Q513 is turned off and the −6V output is stopped (sequence 13). After that, due to the inserted diode D519, the 10.8V supply is stopped (sequence 112) earlier than the −6V supply stop (sequence 113), thereby the charge remaining problem of the circuit for supplying supply voltages to the liquid crystal display panel is eliminated and the supply of supply voltages is stopped in a normal sequence. In other words, the screen of the liquid crystal display panel is prevented from the noise that is otherwise generated upon the stop of the supply voltages.

The 3.3V corresponds to the first input voltage, the −8V corresponds to the second input voltage, the 40V corresponds to the third input voltage, the 13V and the 21V correspond to the fourth input voltage, the 3.3V corresponds to the first output voltage, the −6V corresponds to the second output voltage, the 10.8V corresponds to the third output voltage, the 25V corresponds to the fourth output voltage.

The first resistor corresponds to the R520, the second resistor corresponds to the R518, the third resistor corresponds to the R511, the fourth resistor corresponds to the R512, the fifth resistor corresponds to the R508, the sixth resistor corresponds to the R522 or a set of R501, R502 and R503, the seventh resistor corresponds to the R509, the eighth resistor corresponds to the R527, the ninth resistor corresponds to the R504, the tenth resistor corresponds to the R505, the eleventh resistor corresponds to the R528, the first Zener diode corresponds to the D505, the second Zener diode corresponds to the D503 and the third Zener diode corresponds to the D502.

(3) Conclusion

As described above, the liquid crystal TV set 11 includes the first voltage output unit for inputting 3.3V from the power supply circuit 12 and outputting the 3.3V; the second voltage output unit for inputting 13V and 21V in parallel from the power supply circuit 12 and outputting 10.8V; and the third voltage output unit for inputting 40V from the power supply circuit 12 and outputting 25V And upon the turning-on of the TV set, 3.3V, 10.8V, and 25V are inputted to the liquid crystal display panel 11*c* in this order. Upon the turning-off of the liquid crystal TV set 11, the supply of 25V, 10.8V, and 3.3V is stopped in this order.

While the preferred embodiment of the present invention has been described, it is to be understood that modifications will be apparent to those skilled in the art without departing from the spirit of the invention. However, the following cases will also be included in the embodiment described above:

An invention achieved by changing any combination of the mutually replaceable units, parts, and configurations disclosed in the above embodiment as the occasion may demand An invention achieved by replacing the units, parts, and configurations that are mutually replaceable with those disclosed in the above embodiment, as well as changing any combination of those, although they are not disclosed in the above embodiment, but included in known techniques as the occasion may demand An invention achieved by replacing the units, parts, and configurations disclosed in the above embodiment with the units, parts, and configurations that are supposed as substitutes of those or changing any combination of those according to a known technique that is not disclosed in the above embodiment The detailed description set forth below in connection with the appended drawings is intended as a description of presently preferred embodiments of the invention and is not intended to represent the only forms in which the present invention can be constructed and or utilized.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art.

In addition, reference to "first," "second," "third," and etc. members throughout the disclosure (and in particular, claims) is not used to show a serial or numerical limitation but instead is used to distinguish or identify the various members of the group.

What is claimed is:

1. A liquid crystal TV set, comprising:

a tuner that receives a TV broadcast and extracts a TV broadcasting signal from the TV broadcast, and that output the TV broadcasting signal;

a picture processor for displaying a picture on a liquid crystal display panel according to the TV broadcasting signal output from the tuner;

a voice processor for outputting a voice from a speaker according to the TV broadcasting signal output from the tuner;

a power supply circuit for supplying various types of supply voltages;

a microcomputer for controlling an operation of the TV set;

the TV set includes a sequence circuit for generating various types of voltages on the basis of various types of voltages output from the power supply circuit and supplying the generated voltages to the liquid crystal display panel in a predetermined sequence; the sequence circuit includes:

a first output line for inputting a first input voltage and outputting the first input voltage to the liquid crystal display panel as a first output voltage;

a first NPN type transistor having a base grounded through a capacitor and connected through a first resistor to a collector of the first transistor that inputs a second input voltage, the first transistor outputting a second output voltage to the liquid crystal display panel;

an epitaxial planar NPN type second transistor having a grounded emitter, and turned on with inputting a first power-on-signal to a base of the second transistor and turned off with stopping input of the first power-on-signal to the base of the second transistor from the microcomputer, respectively;

a first Zener diode having an anode connected to the emitter of the first transistor through a second resistor and a cathode connected to the collector of the second transistor through a third resistor;

a PNP type third transistor having a base connected to the cathode of the Zener diode, and an emitter connected to the base of the third transistor through a fourth resistor and supplied a third input voltage;

an NPN type fourth transistor having a base connected to the collector of the third transistor through a fifth resistor, an emitter grounded through a sixth resistor, and a collector being supplied a fourth input voltage through a seventh resistor;

an NPN type fifth transistor having a base connected to the collector of the third transistor through the fifth resistor, an emitter grounded through the sixth resistor, a collector being supplied the fourth input voltage through the seventh resistor, and the fourth and fifth transistor outputting a third output voltage to the liquid crystal display panel;

a second Zener diode having a cathode connected to the bases of the fourth and fifth transistors respectively and a grounded anode;

an epitaxial planar NPN type sixth transistor having a grounded emitter and turned on with inputting a second power on signal to the base of the sixth epitaxial planar NPN type transistor and turned off with stopping the second power on signal to the base of the sixth epitaxial planar NPN type transistor from the microcomputer, respectively;

a PNP type seventh transistor having a base connected to the collector of the sixth transistor and an emitter connected to the base of a seventh transistor through a eighth resistor and supplied the third input voltage;

an NPN type eighth transistor having a collector connected to the emitter of the seventh transistor through a ninth resistor, a base connected to the collector of the seventh transistor through a tenth resistor, an emitter grounded through a eleventh resistor, the eighth transistor outputting a fourth output voltage to the liquid crystal display panel; and a third Zener diode having a cathode connected to the base of the eighth transistor and a grounded anode, the sequence circuit, when inputting the first, the second, the third and the fourth input voltages after the TV set is powered and the first power-on-signal is inputted, outputs the first output voltage as is at first;

the second input voltage is applied to the collector of the first transistor, which is then self-biased and turned on to output the second output voltage;

the second transistor is turned on with the first power-on-signal inputted to the base of the second transistor, thereby the third transistor is turned on, then the third, fourth, and fifth transistors are turned on and voltages supplied from the fourth input voltage line are lowered through the seventh resistor to be output as the third output voltage;

finally, upon the turning-on of the sixth transistor with the second power-on-signal inputted later than the first power-on-signal, the seventh transistor is self-biased and turned on with the third input voltage applied to the emitter of the seventh transistor, so that the eighth transistor is turned on to output the fourth output voltage, thereby voltages are supplied to the liquid crystal TV set in the order corresponding to the first output voltage, the second output voltage, the third output voltage and the fourth output voltage;

upon the turning-off of the power to the liquid crystal TV set, the first power-on-signal is stopped and the inputs of the first, the second, the third and the fourth input voltages to the sequence circuit are stopped;

in the sequence circuit, the second-power-on signal inputted to the base of the sixth transistor is stopped, thereby the sixth transistor is turned off, then the seventh and eighth transistors are turned off to stop supply of the fourth output voltage to the liquid crystal display panel;

the first power-on-signal is stopped and the second transistor is turned off, discharging of the remaining charge of the third input voltage inputted to the third transistor begins through the first Zener diode, and upon the lowering of the third input voltage to the break voltage of the first Zener diode, the first Zener diode stops breakdown and the third transistor is turned off to stop outputting the third output voltage; and finally, the first input voltage supply is stopped, thereby the first transistor is turned off and the second output voltage is stopped, thereby supply of voltages to the liquid crystal TV set are stopped in the order corresponding to the fourth output voltage, the third output voltage, the first output voltage and the second output voltage.

2. A liquid crystal display unit for inputting a supply voltage from a power supply circuit and displaying a picture on a liquid crystal display panel according to an inputted picture signal; comprising the display unit includes a sequence circuit that generates various levels of voltages using various levels voltages output from the power supply circuit and supplies the generated voltages to the liquid crystal display panel in a predetermined sequence; the sequence circuit includes:

a first voltage output part outputting a first output voltage using inputted a first input voltage and;

a second voltage output part outputting a second output voltage using inputted a second input voltage; and a third voltage output part outputting a third output voltage using inputted a third input voltage;

if the liquid crystal display unit is turned-on, the first output voltage is supplied to the liquid crystal display firstly, the second output voltage is supplied to the liquid crystal display secondly, and the third output voltage is supplied to the liquid crystal display thirdly, and if the liquid crystal display unit is turned-off, the third output voltage is stopped firstly, the second output voltage is stopped secondly, and the first output voltage is stopped thirdly; wherein the second voltage output part consists of multiple steps in each of which a plurality of switching transistors are connected to each another;

at least one PNP type switching transistor self-biased between the base and the emitter thereof is included in the plurality of switching transistors;

the cathode of a Zener diode is connected to the base of the PNP type switching transistor and the anode of the Zener diode is grounded, thereby the PNP switching transistor is turned off upon falling of a base voltage of the PNP type switching transistor to a breakdown voltage of the Zener diode, thereby the sequence is realized.

3. The liquid crystal display unit according to claim 2; wherein the second input voltage inputted to the emitter of the PNP type switching transistor is discharged through a self-biased resistor after the stop of its input and a time required until the NPN type switching transistor is turned off is longer than an interval of the sequence; and a timing at which the PNP type switching transistor is turned off by the Zener diode is adjusted in the sequence.

* * * * *